Figure 1:
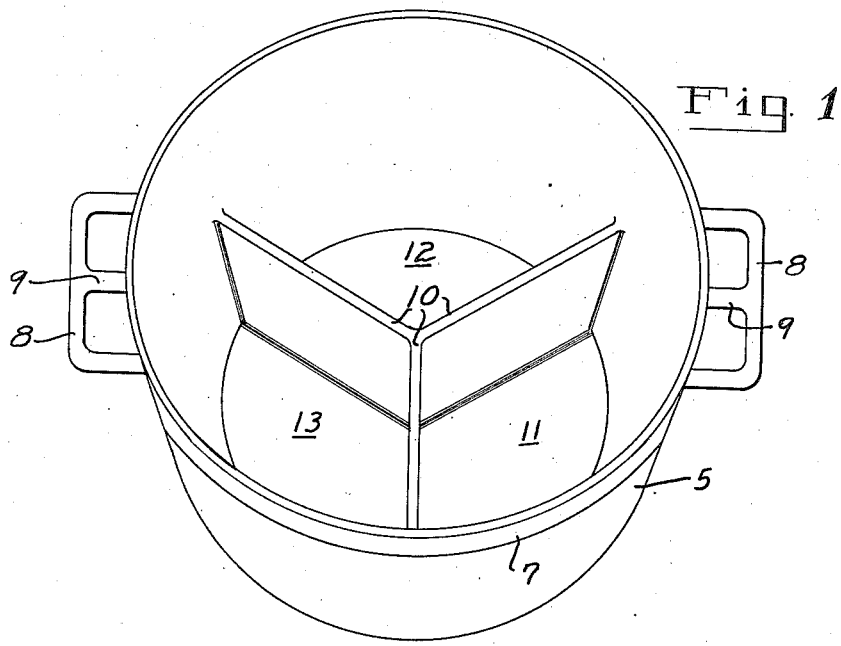

Dec. 3, 1940.　　　　　W. B. SMITH　　　　　2,223,432

COMBINATION COOKING VESSEL

Filed April 26, 1940

INVENTOR
WILLIAM B. SMITH
BY *Johnston & Jennings*
ATTORNEYS

Patented Dec. 3, 1940

2,223,432

UNITED STATES PATENT OFFICE 2,223,432

COMBINATION COOKING VESSEL

William B. Smith, Atlanta, Ga.

Application April 26, 1940, Serial No. 331,876

4 Claims. (Cl. 53—1)

My invention relates to a combination cooking vessel comprising a partially subdivided boiler adapted to have nested therein a baking pan which, by engagement with the boiler subdivisions, will convert the latter into closed separate cooking compartments, when such use of same is desired.

My invention further contemplates the provision of a top applicable either to the baking pan or the boiler, so that it may be used to cover either of the combination vessels when used singly, or the uppermost when used in combination.

My invention further contemplates the use of a demountable perforated plate adapted to be seated on the partitions in the boiler, so that steam cooking can be carried out above it in the undivided upper portion of the boiler.

My invention further comprises the novel details of construction and arrangement of parts which are illustrated only in their preferred embodiments in the accompanying drawing, their distinctive features being pointed out in the appended claims.

Figures 2, 3:
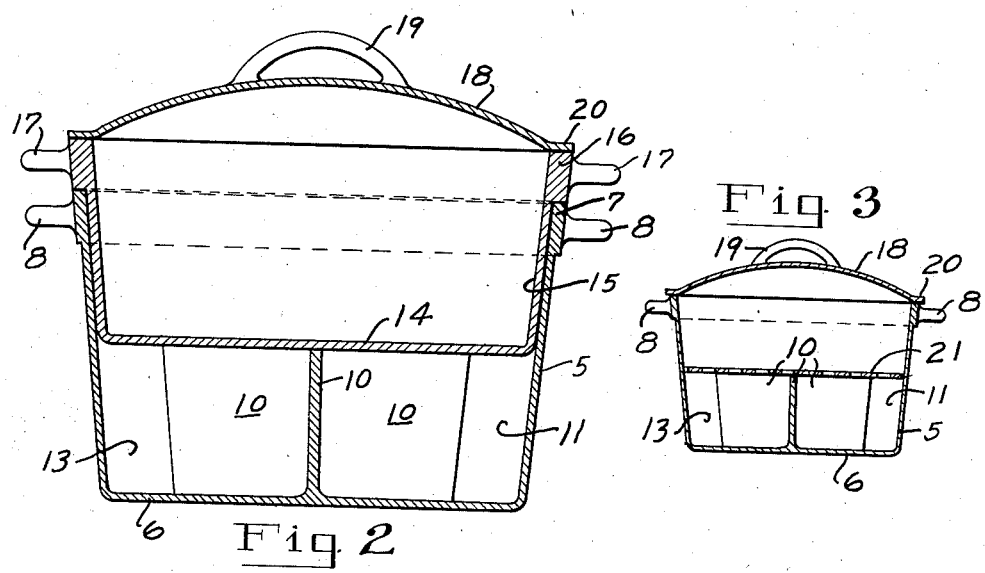

According to the drawing,

Fig. 1 is an enlarged perspective view of the boiler showing the partitions subdividing its lower interior portion into three separate cooking compartments;

Fig. 2 is a vertical central cross sectional view through the boiler, on a slightly reduced scale, showing the baking pan nested therein and seated on the partitions so as to close and segregate the subdivided boiler cooking compartments; and Fig. 3 is a cross sectional view through the boiler corresponding to Fig. 2, but on a still further reduced scale, showing the baking pan removed and the cover applied to the boiler, and showing a perforated plate which may be set on the boiler partitions to support any food it is desired to steam cook in the boiler's upper portion, otherwise this plate is not used and any common boiler cooking can be carried out in the pot as a whole.

Similar reference numerals refer to similar parts throughout the drawing.

In the embodiment of my invention illustrated in the drawing, I show the main cooking vessel in the form of a boiler 5, having its body wall slightly tapered downwardly to a flat bottom 6, and having about its upper marginal edge an annular shoulder 7 carrying the handles 8 which comprise a center web 9, by means of which the vessel can be lifted by hooks engaging these opposed members 9.

The lower interior portion of the boiler is subdivided by a three-way partition 10 forming three separate cooking compartments indicated at 11, 12 and 13 in Fig. 1. The partitions are struck off to a true level overhead and are adapted to receive the flat bottom 14 of a baking pan 15, the side walls of which are tapered to telescope and fit snugly into the upper open unpartitioned portion of the boiler by the time its flat bottom 14 has seated flush on the upper edges of the three-way partition 10, thereby serving as a closure for the separate compartments 11, 12 and 13. This baking pan 15 is also provided with an external marginal shoulder 16 carrying handles 17, corresponding to 8, and its upper edge is flattened to receive the marginal edge 20 of a dished cover 18 having a center top handle 19. This cover's flat marginal flange 20 is adapted to fit equally upon the shoulder 7 or 16, according as it is used to close the pot 5 or the baking pan 15. In Fig. 3 this top is shown seated on the boiler 5, which is in use as a single boiler or cooking vessel. If desired, it may have a removable perforated plate 21, which may be seated loosely on the partition 10 so as to support vegetables or food for steam cooking above water in the bottom of the boiler.

With the vessel assembled as in Fig. 2, three different vegetables can be cooked in the compartments 11, 12 and 13, which are kept separate by the use of the baking pan 15, in which other cooking may proceed, or the baking pan can be removed and used separately in the normal manner for cooking, while the boiler itself may be likewise used as a single boiler or as a steamer, with or without the cover 18. When used as a common boiler the vegetables or other foods being cooked will have common access to the compartments 11, 12 and 13, which stand open to the upper portion of the boiler.

Having thus pointed out the distinguishing characteristics of my invention, but without intending to limit myself to the specific details shown, what I claim as new is:

1. A combination cooking vessel, comprising a boiler subdivided in its lower portion only by vertical partitions defining a plurality of separate cooking compartments, and a cooking pan shaped to telescope into the upper portion of, and form a top closure for, said boiler.

2. A combination cooking vessel, comprising a boiler subdivided in its lower portion only by partitions defining a plurality of separate cooking compartments, and a cooking pan shaped to telescope into the upper portion of said boiler until it seats on said partitions and forms a closure overhead for separating the cooking compartments they define.

3. As a cooking vessel, a boiler having its lower interior subdivided by vertical partitions into a plurality of separate cooking compartments, the boiler being free of contraction above the partition level to permit the introduction of a cover element to engage said partitions and form a top closure for said compartments.

4. In combination, a boiler having in its lower interior radial partitions defining three equal compartments, and a baking pan adapted to be telescoped into said boiler and having its bottom shaped and disposed to engage said partitions so as to close said compartments.

WILLIAM B. SMITH.